3,594,415
TRICARBALLYLIC ACIDS
William A. Zisman, Silver Spring, and Jacques G. O'Rear, Camp Springs, Md., assignors to the United States of America as represented by the Secretary of the Navy
No Drawing. Filed Aug. 30, 1968, Ser. No. 756,426
Int. Cl. C07c 63/56
U.S. Cl. 260—515
3 Claims

ABSTRACT OF THE DISCLOSURE

New triacids which are ω-(p-chlorophenyl)- and ω-(3,4,5-trichlorophenyl) n-alkyltricarballylic acids in which the alkyl group has from 3 to 20 carbon atoms. The new triacids are used to prime hard inorganic solids with a film which, essentially, is an adsorbed monolayer of the triacid. The film is a coupling agent for promoting bonding of organic coatings to the solids.

---

The invention described herein may be manufactured and used by or for the Government of the United States of America for governmental purposes without the payment of any royalties thereon or therefor.

This invention relates to new triacids which are chlorophenyl substituted straight chain alkyl tricarballylic acids. It also relates to the surface modification of hard inoragnic solids with the new tricarballylic acids to promote bonding of organic coatings to the solids.

BACKGROUND OF INVENTION

In the coating of solid surfaces using liquid organic film-forming compositions it is essential to achievement of good bonding of the organic coatings to the solids that the applied liquid compositions spread spontaneously on the solid surfaces. By freely spreading, they will completely wet the solid surfaces, including hills and valleys, to almost competely eliminate the occurrence of air bubbles and voids at the coating-solid interface.

Solids can be conveniently separated into two classes: those of high surface energy and those of low surface energy. High surface energy solids are normally hard, have high melting points and surface energy values in the range of from about 5000 to 500 ergs/cm.$^2$ at ordinary temperatures. Examples are the hard inorganic materials such as glass fused quartz, ceramics, α-alumina, most metals, and various metal oxides and nitrides. Low surface energy solids are normally soft, have low melting points and surface energy values generally under 100 ergs/cm.$^2$ at ordinary temperatures. Examples are solid organic polymers, waxes, resins and in fact most organic compounds.

Liquids (excepting the liquid metals) have low surface energies, less than 100 ergs/cm.$^2$ at ordinary temperatures. A liquid will spread spontaneously on a solid when the surface energy of the liquid is less than that of the solid. Thus, liquids will spread freely on high energy solid surfaces since a large decrease in the surface energy of the system will result. But in the case of low energy solids, the surface energies of the liquids are comparable to those of the solids and systems are to be encountered which show nonspreading, that is, the liquid will have a surface tension, $\gamma_{LV}$, which is greater than the critical surface tension of wetting, $\gamma_c$, of the solid.

Since many organic coating compositions are applied as solutions having low surface tensions it might be supposed that they would invariably spread spontaneously on hard inorganic soilds. Such is usually not the case, however. This is because high surface energy solids quickly adsorb water or organic compounds to form thereon an absorbed monolayer of low surface energy on which the applied coating compositions will not spread. In such systems the liquid coating compositions have a surface tension higher than the critical surface tension of wetting of an adsorbed monolayer of the containant. In this respect, the critical surface tension of wetting of an adsorbed monolayer of water is 30 dynes/cm. at 20° C. and of an adsorbed monolayer of a number of polar-nonpolar organic compounds, for example, of fatty acids and amines, is 30 dynes/cm. or at 20° C. or less. To spread spontaneously on such adsorbed monolayers, a liquid organic coating composition must have a surface tension which is less than 30 dynes/cm. A consequence of the nonspreading is to unnecessarily limit the number of liquid organic coating compositions which may be successfully applied for coating high surface energy solids with organic film-forming materials.

It is an object of the present invention to provide new tricarballylic acids.

It is also an object to provide hard inorganic solids with a novel primer which promotes good bonding of organic coatings to the solids.

It is a further object to provide an improved method of coating organic film-forming materials on hard inorganic solids.

It is an other object to provide a method of coating organic film-forming materials on hard inorganic solids in which a greater number of common liquid organic coating compositions having low surface tensions may be successfully applied for the coating.

STATEMENT OF INVENTION

The above and other objects are accomplished following the present invention in the new tricarballylic acids of the formula:

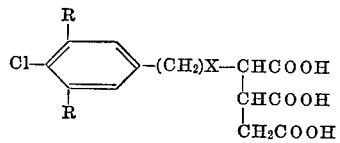

wherein R is hydrogen or chlorine and X is an integer from 3 to 20, and in the use of the new triacids for priming hard inorganic solids with a film which essentially, is an adsorbed monolayer of the triacid and functions to promote bonding of organic coatings to the solids.

Among the new tricarballylic acids of the above formula, are, for example,

2-[ω-(p-chlorophenyl)propyl]-2-[ω-(3,4,5-trichlorophenyl)propyl]-,
2-[ω-(p-chlorophenyl)butyl]-,
2-[ω-(3,4,5-trichlorophenyl)butyl]-,
2-[ω-(p-chlorophenyl)hexyl]-,
2-[ω-(3,4,5-trichlorophenyl)hexyl]-,
2-[ω-(p-chlorophenyl)dodecyl]-,
2-[ω-(3,4,5-trichlorophenyl)dodecyl]-,
2-[ω-(p-chlorophenyl)hexadecyl]-2-[ω-(3,4,5-trichlorophenyl)hexadecyl]-,
2-[ω-(p-chlorophenyl)eicosyl]-
and 2-[ω-(3,4,5 - trichlorophenyl)eichosyl] tricarballylic acid, etc. These triacids are soluble in common organic solvents such as ethanol, benzene, toluene and benzene. They are also soluble in ethanol-water mixtures in which the water content is less than that which would cause precipitation from the solution.

The new tricarballylic acids may be prepared from the corresponding monocarboxylic acids of the series ω-(p-C$_6$H$_4$Cl)(CH$_2$)$_x$COOH and

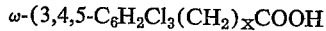

wherein X is an integer from 3 to 20 by the following route: reduction of the starting monocarboxylic acid to the alcohol, conversion of the alcohol to the bromide, reaction of the bromide with sodio malonic ester to form the monoalkylated malonic ester, subjection of the monoalkylated malonic ester to Michael's condensation with alcoholic sodium ethoxide and diethyl fumarate to form the tetraester, saponification of the tetraester followed by acidification, and decarboxylation of the tetra acid to the triacid. This synthesis route shown in schematic form is:

Scheme I

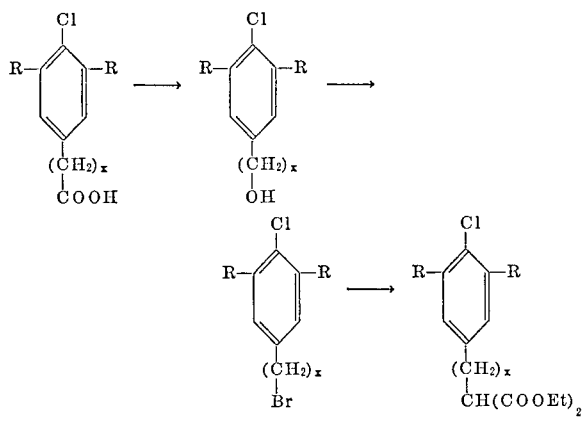

Scheme II

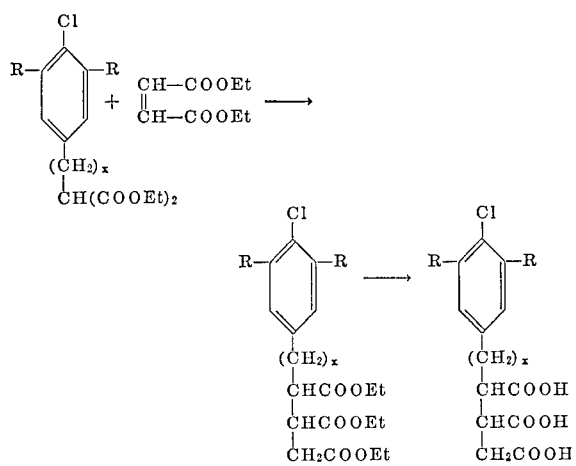

The starting monocarboxylic acids of the above series may be prepared by the method of Fieser and Coworkers, J. Amer. Chem. Soc. 70, 3197(1948) in which the Wolff-Kishner procedure as modified by Huang-Minlon is used for reduction of the corresponding intermediate ω-p-chlorobenzoyl- and ω-(3,4,5-trichlorobenzoyl) alkanoic acids.

Reduction of the starting monocarboxylic acid to the alcohol is done by standard procedure using lithium aluminium hydride and conversion of the alcohol to the bromide by the method of Collins and Davis, J. Chem. Soc. 1863 (1961) using 50% aqueous HBr. The bromide is reacted to form the monoalkylated malonic ester by the method of Ramart-Lucas and Papadakis, Ann. Chem. 18, 46–71 (1932). The Michael condensation is conducted following the method of Duff and Ingold, J. Chem. Soc. 87 (1934) and Rydon, J. Chem. Soc. 420 (1935). The saponification, acidification and decarboxylation steps are carried out by conventional procedures.

Preparation of the new tricarballylic acids is illustrated by the following specific example.

EXAMPLE

ω-(p-Chlorophenyl)hexanoic acid is reduced to the corresponding alcohol with LiAlH$_4$ by standard procedure and the alcohol converted to the ω-(p-chlorophenyl)hexyl bromide by treatment of the alcohol with 50% aqueous hydrobromic acid (2 ml./g.) and conc. sulfuric acid (2 ml./g.) for 20 hours at 100° C. The bromide is purified by distillation. Yield: 241 (85.5%).

Alcoholic sodium ethoxide solution is prepared by reacting sodium (19.5 g.) with dry ethyl alcohol (500 ml.). To this solution is added, with stirring, diethylmalonate (139.7 g.) and then during one hour, under stirring and refluxing of the mixture, ω-(p-chlorophenyl)hexyl bromide (160 g.). Stirring and refluxing are continued 4 more hours. After flash evaporation of the alcohol, the residue is extracted with ether, the ether extract washed with water, dried and distilled. Yield of diethyl ω-(p-chlorophenyl) hexylmalonate, 167 g. (81.1%).

Alcoholic sodium ethoxide solution is prepared by reacting sodium (7.92 g.) with dry ethanol (300 ml.). Diethyl ω-(p-chlorophenyl) hexylmalonate (122.2 g.) is added dropwise to the stirred solution. With continued stirring, diethyl fumorate (77.1 g.) is added during 1 hour. The mixture is stirred for 24 hours, then diluted with 1 lb. of ether. The ether extract is washed with water, dried and concentrated in vacuo (200° C.; 1 mm. ttg.). Yield: 175 g. (96.2%) of orange oil, the crude tetraester, which was used in the next step, without purification.

A combined acid hydrolysis and decarboxylation operation is performed with the above tetraester by refluxing the crude tetraester (157 g.), conc. sulfuric acid (182 ml.), water (182 ml.) and formic acid (546 ml.) The mixture is cooled and filtered. The collected yellow solids are washed with water and dried to yield 144 g. of crude partial esters of 2-[ω-(p-chlorophenyl)hexyl] tricarballylic acid. For purification, the crude partial esters (144 g.) are refluxed with ethanol (336 ml.), toluene (150 ml.) and sulfuric acid (1.5 ml.) for 4 hours, the volatile solvents removed by distillation, and this procedure repeated. The final residue is taken up in ether, washed with water, dried and distilled. Yield: 124 g. (78.1%) of triethyl 2-[ω-(p-chlorophenyl)hexyl] tricarballylate; B.P. 220° C./0.4 mm. Hg.

The tricarballyate obtained as above is saponified by refluxing a mixture of 0.5 g. of this ester, 25 ml. of 0.2 N aqueous KOH and 100 ml. of a solvent for 72 hours (at about 120° C.). The saponification reaction is diluted with water and acidified with conc. HCl to precipitate the triacid. The precipitated triacid is collected by filtration, washed with water and dried. Yield: 95 g. (96.1%) of the tricarballylic acid; M.P. 100–120° C. The triacid product is a mixture of two diasteroisomers which can be resolved by fractional recrystallization from ether-pentane mixtures.

The triacids of the above formula adsorb to hard inorganic solids, especially metals, to provide therein an adsorbed monolayer which as an outer surface consisting of closely packed p-chlorophenyl or 3,4,5-trichlorophenyl groups, oriented away from the solids, and a critical surface tension of wetting of from 40–45 dynes/cm. at 20° C.

The presence of an adsorbed monolayer of a triacid of the above general formula on hard inorganic solids, for example, those described above, provides a new surface on the solids to which water and polar-nonpolar organic compounds having surfaces energies less than that of the adsorbed monolayer will not adsorb. The chlorophenyl groups being very hydrophobic, water molecules will not concentrate on the adsorbed monolayer. The surface energy differences between the adsorbed monolayer and the aforesaid polar-nonpolar organic compounds being small, the latter will not adsorb to the monolayer.

Any liquid organic coating composition which has a surface tension less than the critical surface tension of wetting of the adsorbed monolayer of the triacid will spread spontaneously on the adsorbed monolayer to provide improved coating of organic film-forming materials on hard inorganic solids. They may be applied to the solid surfaces, primed with an adsorbed monolayer of the acid, in conventional manner, as by spraying, dipping or brushing. The spreading liquid compositions will displace water or a polar-nonpolar organic compound as defined above from the adsorbed monolayer since they are but lightly held on the monolayer. Typical of liquid organic coating compositions which are nonspreading on an adsorbed film of water or of one of the aforedefined polar-nonpolar organic compounds on hard inorganic solids but which will spread freely on an adsorbed monolayer on hard inorganic solids following the present invention are low surface tension solutions of hydrocarbon polymers, e.g., polystyrene, in solution in benzene or toluene, which solvents have surface tensions of 28 dynes/cm. at 20° C.; solutions in benzene or toluene of a vinyl ester polymer, such as polyvinyl acetate, or of a methacrylic ester polymer, such as polymethyl methacrylate, and liquid epoxy resin mixtures, such as 2,2-bis(4-hydroxyphenyl) propane and m-phenylene diamine or m-aminobenzylamine.

In the practice of the invention, an adsorbed monolayer of one of the triacids of the above formula is provided on hard inorganic solids, for example, glass, steel, stainless steel, chromium, cadmium, nickel, zinc, etc. by immersing the solid in a bath which is at ordinary temperatures and is a dilute solution of the triacid in a volatile solvent having a surface tension higher than the critical surface tension of wetting of the adsorbed monolayer of the triacid, allowing contact of the solution with the solid for a period of time sufficient to form the adsorbed monolayer on the solid, generally about 10 minutes, and withdrawing the solid from the bath in a vertical direction. Withdrawal of the solid in a vertical direction gives better draining of solution from the adsorbed monolayer on the solid. The presence of an adsorbed monolayer on the treated solid can be visually observed by noting retraction (rolling away) of solution from the interface with the adsorbed monolayer as the solid is withdrawn vertically from the bath.

Ethanol-water mixtures are suitable as high surface tension solvents for forming the dilute solution of the triacids. Water has a surface tension of 72 dynes/cm. at 20° C. Ethanol has a surface tension of 22 dynes/cm. at 20° C. The triacids are first dissolved in ethanol. Water is added to the ethanol solutions to form mixed solvent solutions which have surface tensions higher than the critical surface tension of wetting of the adsorbed monolayer of the triacid. The amount of water added is controlled to avoid precipitation of the triacid from the solution. Suitable proportions of ethanol and water for forming the high surface tension mixed solvent solution of the triacids are of the order of 1:7 parts by weight ethanol to water.

Concentrations of the triacids in the dilute solutions may vary from about 0.01 to 5% by weight, with a practical range generally being from about 0.1 to 2% by weight. The higher concentrations of the triacids tend to promote a faster rate of formation of the adsorb monolayer on the solids.

A particular application of an adsorbed monolayer of a triacid of the above series is as a primer on strands of stainless steel filaments to protect the filaments against adsorption of water and undesirable low surface tension polar-nonpolar organic materials as defined above and improve the bonding thereto of low surface tension liquid resinous adhesives, such as liquid epoxy resin-amine-curing agent mixtures, which are applied for forming filament-wound, metal fiber-resin, hollow structures. The strands of stainless steel filaments are drawn through a room temperature bath of a 0.1–1.0% by weight solution of the triacid, for example, 2-[ω-p-chlorophenyl)hexyl] tricarballylic acid, in a high surface tension ethanol-water mixture, which may be one of a 1:7 ratio by weight of ethanol to water, at a rate to provide contact between the solution and the glass filaments for a time sufficient to effect adsorption of a monolayer of the dicarboxylic acid to the filaments, for example, about 10 minutes, and the treated filaments withdrawn from the bath in a vertical direction.

Another particular application of an adsorbed monolayer of one of the triacids of the above series is in the priming of the walls of tooth cavities to promote bonding thereto of plastic fillings such as commercially available epoxy resin fillings which contain an accelerator for room-temperature curing. The tooth is prepared by grinding off the outer surface of the walls of the cavity, under dry conditions, exposing a fresh surface of hydroxyapatite of the tooth which is then directly swabbed with a dilute solution of one of the triacids e.g. 0.1% by weight of the triacids, in a high surface tension ethanol-water mixture. After a period of about ten minutes a monolayer of the triacid is adsorbed to the hydroxyapatite of the walls of the cavity. The epoxy resin filling, as a highly viscous mass, is then worked into the cavity to make contact with the adsorbed monolayer of the triacid on the walls of the cavity. The presence of the adsorbed monolayer on the cavity walls promotes flow thereon of the filling. While it is still plastic, to reach and make contact with tiny hills and valleys on the cavity walls and thereby give better bonding of the filling to the tooth.

While for the practice of the invention it is essential that the hard inorganic solids be primed wth an adsorbed monolayer of a triacid of the series, the invention may also be practiced to advantage when the adsorbed monolayer is overlaid with a deposited layer of one or two molecules of the triacid.

Although the invention has been described herein with reference to certain specific embodiments thereof, such are intended by way of illustration and not in limitation except as many be defined in the appended claims.

What is claimed and desired to be secured by Letters Patent of the United States is:

1. A tricarballylic acid of the formula:

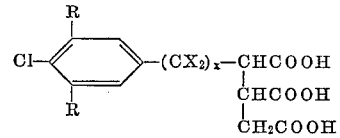

wherein R is a radical selected from the group consisting of hydrogen and chlorine and X is an integer from 3 to 20.

2. A tricarballylic acid as defined in claim 1, wherein R is hydrogen.

3. A tricarballylic acid as defined in claim 1, wherein R is chlorine.

References Cited

Chem. Abstracts, 54: 13120g (1960).

JAMES A. PATTEN, Primary Examiner

V. GARNER, Assistant Examiner

U.S. Cl. X.R.

117—72; 260—475, 618, 649, 651